June 12, 1928.

H. F. LAWRENCE

STUFFING BOX

Filed July 16, 1921

1,673,751

Inventor—
Howard F. Lawrence
by his Attorneys—
Howson & Howson

Patented June 12, 1928.

1,673,751

UNITED STATES PATENT OFFICE.

HOWARD F. LAWRENCE, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

STUFFING BOX.

Application filed July 16, 1921. Serial No. 485,164.

One object of this invention is to provide a stuffing box for application to plungers, piston rods, valve rods and the like, which shall at all times prevent leakage through it regardless of variations in the pressure of the fluid to which it is exposed and whose construction shall be such as to obtain this result with a relatively small, substantially uniform pressure on the rod or plunger.

A further object of the invention is to provide a stuffing box of such construction that its packing shall automatically act to prevent leakage without requiring to be manually tightened or without necessitating the setting up of a gland and whose arrangement of parts shall be such as to prevent an increase of the friction between the packing and the rod;—the invention being designed for application to reciprocating rods or plungers regardless of whether they are horizontally or vertically operative, and being suitable for application to machines operative by or upon liquids as well as gases.

Figure 2:
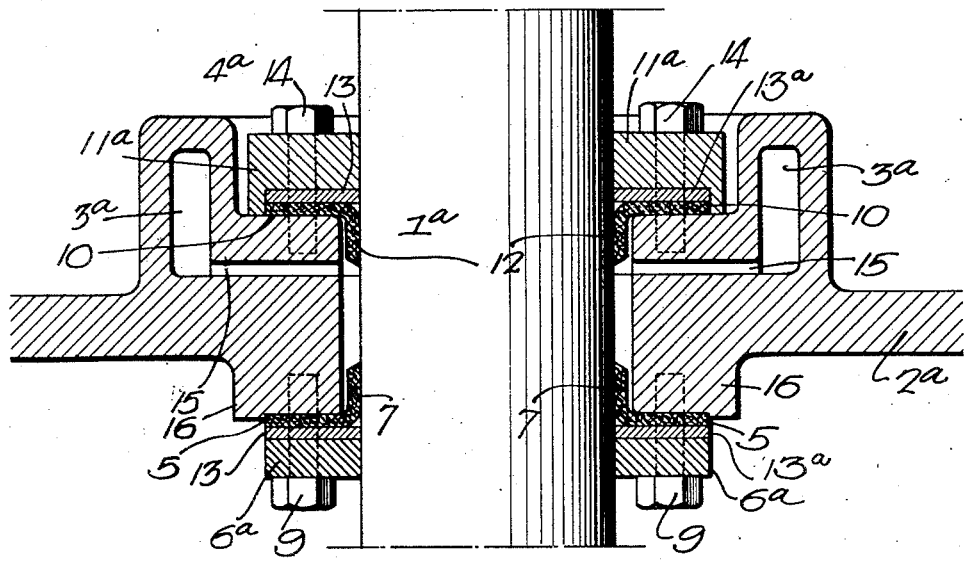
Figure 1:
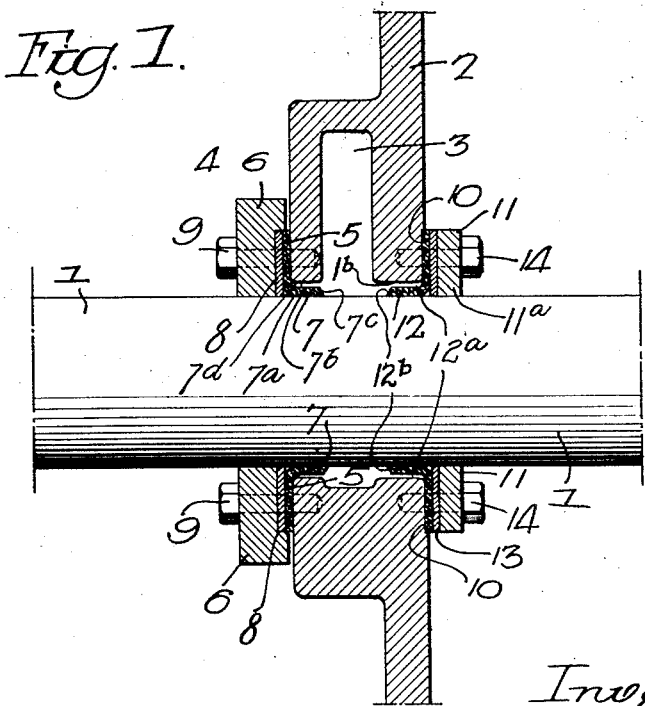

These objects and other advantageous ends I attain as hereinafter set forth, reference being had to the accompanying drawings, in which, Figs. 1 and 2 are sections taken longitudinally through two stuffing boxes, showing my invention as applied thereto.

In Fig. 1 of the above drawings, 1 represents a rod or plunger passing through an opening $1^b$ in a cylinder wall or equivalent structure 2. In accordance with my invention said cylinder wall adjacent the opening for the rod 1 has formed in it an air chamber 3 connected to or in communication with the rod opening. On the pressure side 4 of the opening in the cylinder wall, which is larger in diameter than the rod 1, I mount a packing in the form of a hat leather 5 clamped by a follower plate 6 against the pressure-receiving face of the cylinder wall 2. This body of packing has a flange 7, one side $7^a$ of which closely fits the rod 1, said flange extending outwardly into the opening for the rod. An opposite side $7^b$ and an inner end $7^c$ of the flange 7 is spaced from an adjacent inner wall $7^d$ of the wall opening $1^b$, affording direct comunication with the air chamber 3.

I may if desired, also provide a clamping ring 8 between this body of packing and the follower plate 6, which is held in place so as to clamp said packing to the cylinder wall by bolts 9. In addition to the above I also provide a second packing ring 10 in the form of a second hat leather clamped against the outside or atmospheric face of the cylinder wall 2 by a follower plate 11 and having an inwardly extending flange 12 projecting into the opening for the rod 1 so as to closely fit the same, the flange 12 having an outer side $12^a$ spaced from the adjacent wall opening $1^b$ as in the case of the opposite flange 7. In this case also I may provide a clamping ring 13 between the follower plate 11 and the outer face of the packing leather 10.

With the above described arrangement of parts if fluid under pressure be admitted to the cylinder or chamber 4, it will leak past the packing 5 into the chamber 3, wherein it will compress the air. It will not however, leak outwardly past the packing 10 since it will so act on the outer side $12^a$ and ends $12^b$ of the inwardly projecting flange 12, causing it to frictionally engage and make a seal with the rod 1.

If the pressure in the cylinder 4 be produced or altogether removed, the expansion of the compressed air or other fluid in the chamber 3 will act on the outer side $7^b$ and end $7^c$ of the flange 7 of the packing 5, causing the inner side $7^a$ likewise to engage frictionally and form a seal with the rod 1. There is consequently no leakage through the cylinder wall 2 along the rod even in the absence of pressure in the cylinder 4. Moreover the device is obviously automatic in action and exerts a constant and perfectly definite pressure upon the rod 1, which may be accurately predetermined and maintained at the proper amount by properly proportioning the flanges 7 and 12.

In Fig. 2 I have shown a slightly modified form of my invention in which the cylinder wall $2^a$ on its pressure side is formed with an annular chamber $3^a$ connected by passages 15 with the opening through which the rod $1^a$ passes. As before, the rod loosely fits said opening which has applied to it an outer packing ring 10 with an inwardly directed flange 12 and held in place by a follower plate $11^a$ and a clamping plate $13^a$. In this case, the follower plate 11ª with its bolts 14 fits into an annular recess defined by the annular wall projection in which is formed the chamber 3ª.

The atmospheric side of the cylinder wall 2ª is provided with a boss 16 against whose outer face is placed the second packing ring 5. This as before has an inwardly projecting flange 7 fitting the rod 1ª and is retained in place by a clamping ring 13ª and a follower plate 6ª retained in place by bolts 9. As in the prior case, the chamber 3ª connects with the cylinder wall opening for the rod 1ª, between the two packing rings 5 and 10, whose flanges extend toward each other and closely fit the rod.

Under operating conditions, fluid under pressure leaks from the interior of the cylinder 4ª past the flange 12 of the packing ring 10, compressing the air in the chamber 3ª. At the same time, by acting on the flange 7 of the packing 5, it prevents leakage along the rod and if the pressure in the cylinder should be removed or diminished, as before, the air under pressure in the chamber 3ª acts on the flange 12 of the packing ring 10, preventing leakage back into the cylinder. The construction and operation of Fig. 2 is otherwise as described for Fig. 1.

Obviously in both of the constructions shown it is immaterial which side of the cylinder wall is exposed to pressure since in any case the flange of one of the packing rings effectually prevents leakage through the stuffing box while the other prevents leakage from the air chamber 3 or 3ª back into the cylinder when the pressure therein is removed or diminished. Obviously it is immaterial whether the packing rings 5 and 12 be continuous or split and they may be made of leather or any other suitable material.

From the above description it will be seen that after once being applied, my device will remain tight without attention and it is of such a nature that setting it up to increase the friction of the packing on the rod, is neither necessary nor possible. The device is operative regardless of whether the rod moves in a horizontal line as in Fig. 1 or in a vertical line as in Fig. 2 and it will perform its functions equally well regardless of whether liquid or gas be employed in or operated upon in the cylinder.

I claim:

1. The combination of a cylinder wall having an opening for the passage of a reciprocating member and formed with a hollow annular projection constituting a chamber, said chamber having a passage communicating with said opening; with two flanged packing rings having their flanges directed toward each other and respectively on opposite sides of the passage to said chamber; and means for clamping said packing rings to the cylinder wall.

2. The combination of a cylinder wall having an opening for the passsage of a reciprocating member and formed with a hollow annular projection constituting a chamber, the latter having a passage communicating with said opening; two flanged packing rings having their flanges directed toward each other and respectively on opposite sides of the passage to said chamber; and means for clamping said packing rings to the cylinder wall including follower plates of which one is mounted within said annular projection.

HOWARD F LAWRENCE